No. 806,630. PATENTED DEC. 5, 1905.
A. BOPP.
TROLLEY.
APPLICATION FILED MAR. 25, 1905.
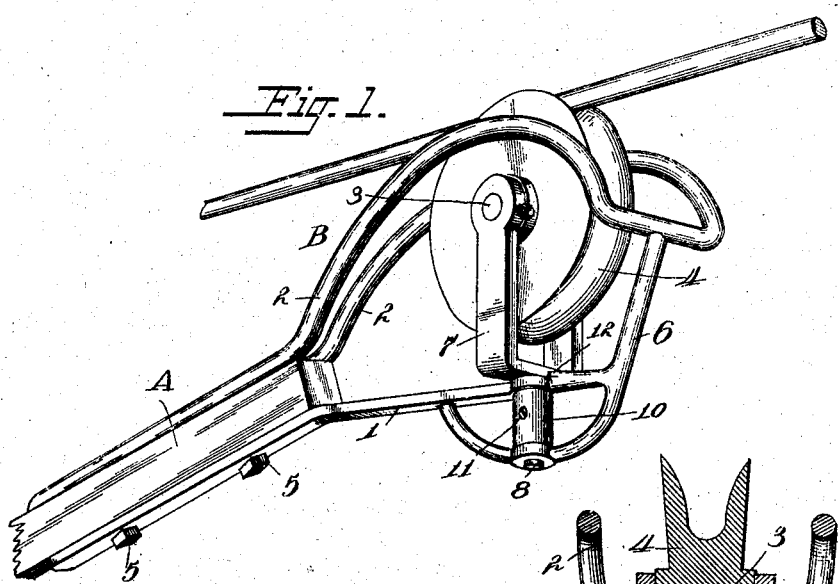
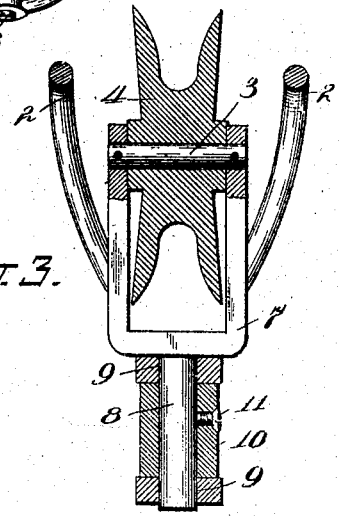
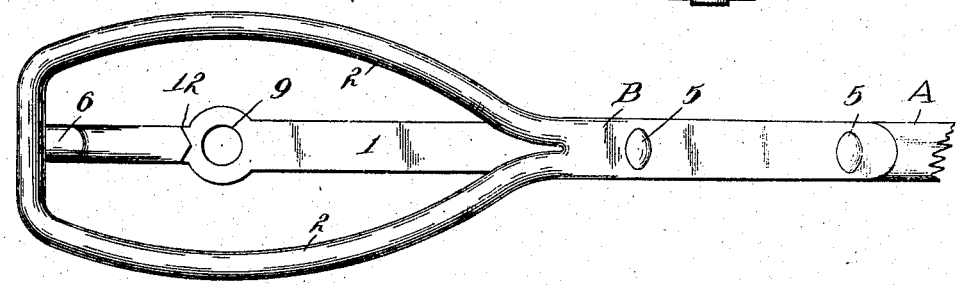
Witnesses
Inventor
Amos Bopp
by his Attorneys

UNITED STATES PATENT OFFICE.

AMOS BOPP, OF BALTIMORE, MARYLAND.

TROLLEY.

No. 806,630.　　　Specification of Letters Patent.　　　Patented Dec. 5, 1905.

Application filed March 25, 1905. Serial No. 252,010.

*To all whom it may concern:*

Be it known that I, AMOS BOPP, a citizen of the United States, residing at Baltimore, in the State of Maryland, have invented certain new and useful Improvements in Trolleys, of which the following is a specification.

My invention relates to an improvement in trolleys; and the primary object is to provide as far as possible against the danger and possibility of the trolley leaving the wire; and a further object is to insure against damage to the trolley-wire supports in the event that the trolley for any reason should get off of the wire.

With these objects in view my invention consists in a pivotally-mounted trolley-wheel in connection with a stop which positively limits the lateral or pivotal turning of the trolley in both directions.

It further consists in a skeleton guard which surrounds the trolley-wheel and rises sufficiently above its axle to prevent the trolley from catching into and pulling down the trolley-wire or cross-arm supports in the event of the trolley leaving the wire and rising above them.

My invention still further consists in certain novel features of construction and combinations of parts, which will be hereinafter described, and pointed out in the claims.

In the accompanying drawings, Figure 1 is a view in perspective. Fig. 2 is a plan view with the trolley-wheel and bearing removed; and Fig. 3 is a cross-section through the bearing, trolley, support, and guard.

A represents the trolley-arm, which may be of the usual form either of tubular metal, wood, or what not.

B represents a metal frame securely bolted to the upper end of the arm. This frame is preferably made, although not necessarily, by any means, in a single piece of metal and comprises the support 1 and the guard 2 2, the latter being arched at the center to extend above the axle 3 of the trolley-wheel 4 and bowed around on both sides of the latter with the forward end preferably secured by the same bolts 5 5 which fasten the support to the trolley-arm. The outer end of the guard is held in place by means of the leg 6, which forms a continuation of the frame, extending upwardly and rearwardly therefrom.

The bearing of the trolley is preferably in the form of a fork 7, in the upper ends of which the axle 3 of the trolley is held, and the shank 8 of the fork is arranged to turn in the orifices 9 9 in the support, while a sleeve 10, secured on the shank between these orifices by the pin 11, retains the fork in place with the shank in the orifices, so that it is capable of turning freely to the right or left and is rendered sensitive to the position of the trolley-wire whether extending straight ahead, at an angle, or on a curve, as the case may be, the trolley and the fork turning or swinging automatically by reason of the lateral pressure against the wire, which causes the wheel to aline and conform in position thereto, thus preventing undue friction or tendency to leave the wire due to lack of conformity to the position or direction of the wire. As the amount of turning movement of the trolley-bearing to conform these variations in directions and position is more or less limited, a V-shaped stop 12 is located in position in rear of the fork to positively limit its turning movement in each direction by affording an abutment therefor; but the stop is of such form and so located that it admits of as wide a range of pivotal movement as is ever required in the most extreme cases, whether in switching or rounding curves or whatever degree of angle or curvature, it being adaptable and sensitive to all possible limitations and conditions to which railroad trolley-wire wiring is susceptible. In this way I have provided a trolley of such construction that the chances of leaving the wire are reduced to the minimum, and the truth of these statements I have practically demonstrated by the actual use of my trolley for several months under the severest test to which it could possibly be subjected with the pole turned forward as well as backward, and as a result of the test the trolley has never been known to jump the wire. The guard is provided purely as a precautionary means, as sometimes through carelessness of the conductor in placing the trolley upon the wire or through other accident if the trolley should happen to leave the track the guard would prevent the supporting-arms or cross-wires from being caught beneath the trolley-wheel and in that way torn down or injured. When a wooden pole is used, the conductor-wire may be attached to the frame or support at any convenient point. Of course this is unnecessary with a metal pole. The cord is also capable of attachment at some point at the rear end of the frame—say in the loop 14 at the bottom, for instance.

It is evident that slight changes might be resorted to in the form and arragement of the several parts described without departing from the spirit and scope of my invention, and hence I do not wish to limit myself to the exact construction herein set forth; but, Having fully described my invention, what I claim as new, and desire to secure by Letters Patent, is—

1. The combination with a trolley-pole, a rigid support extending from its lower side and a rigid guard from its upper side, of a fork journaled in the support, a trolley-wheel journaled in the fork, the guard arching on each side of the wheel above its center.

2. The combination with a trolley-pole, a rigid support extending from its lower side and a rigid guard from its upper side, of a fork journaled in the support, a trolley-wheel journaled in the fork, the guard arching on each side of the wheel above its center, and means connecting the outer ends of the guard and support.

3. The combination with a frame comprising a support and guard integral with each other, of a fork journaled in the support and carrying a trolley-wheel at a point between the members of the guard, and a centrally-located stop in position to be engaged by the fork to limit its pivotal movement in each direction.

4. The combination with a support, and guard, of a fork journaled in the support, a trolley-wheel journaled upon an axle carried in the fork, and a V-shape stop adjacent to the fork in position to be engaged, by the latter to limit the lateral or pivotal movements of the fork.

5. The combination with a support having a stop thereon, a guard comprising two members bowed laterally and arched upwardly, and a leg extending from the support and sustaining the outer end of the guard, of a fork journaled in the support, an axle carried by the fork and a trolley-wheel mounted on the axle.

6. The combination with a frame comprising a support, a guard, and a leg connecting the support and guard at the rear end, of a trolley-wheel pivotally and revolubly mounted in the support.

In testimony whereof I have affixed my signature in presence of two witnesses.

AMOS BOPP.

Witnesses:
A. M. GILMOUR,
GEO. J. THOMAS.